US005538619A

United States Patent [19]
Miller

[11] Patent Number: 5,538,619
[45] Date of Patent: Jul. 23, 1996

[54] ELECTRO-CHEMICAL METHOD FOR MINIMIZING OR PREVENTING CORROSION OF REINFORCEMENT IN CONCRETE

[75] Inventor: John B. Miller, Oslo, Norway

[73] Assignee: Norwegian Concrete Technologies A/S, Oslo, Norway

[21] Appl. No.: 232,616

[22] Filed: Apr. 25, 1994

Related U.S. Application Data

[60] Division of Ser. No. 781,989, Oct. 24, 1991, Pat. No. 5,320,722, which is a continuation-in-part of Ser. No. 539,069, Jun. 15, 1990, Pat. No. 5,228,959, which is a division of Ser. No. 366,204, Jun. 9, 1989, Pat. No. 5,198,082, and a continuation-in-part of Ser. No. 352,266, May 16, 1989, abandoned, and a continuation-in-part of Ser. No. 100,834, Sep. 25, 1987, Pat. No. 4,832,803.

[51] Int. Cl.$^6$ .............................. C23F 13/00; C25B 1/26
[52] U.S. Cl. .......................................... 205/734; 205/687
[58] Field of Search ........................... 204/130, 147, 204/148, 196, 197; 205/734, 687

[56] References Cited

U.S. PATENT DOCUMENTS

| | | | |
|---|---|---|---|
| 4,832,803 | 5/1989 | Vennesland et al. | 204/130 |
| 5,198,082 | 3/1993 | Vennesland et al. | 204/196 |
| 5,228,959 | 7/1993 | Miller | 204/147 |

OTHER PUBLICATIONS

"Realkalisering af carbonatiserede betonfacader ved elektro-osmose", Dansk Beton No. 4, 1988, pp. 20, 21, 23, 25.

*Primary Examiner*—T. Tung
*Attorney, Agent, or Firm*—Schweitzer Cornman & Gross

[57] ABSTRACT

A process and system for rehabilitating mature concrete structures, which have become carbonated and/or infused with chlorides and thus represent a corrosive environment for internal reinforcing steel. The surface of the concrete is first repaired with a special mortar having resistivity and capillarity consistent with the parent concrete and the process requirements. An elongated, flat, flexible, ribbon-like electrode element is supported in spaced relation over the surface of a concrete area to be treated, being threaded back and forth and oriented in edgewise fashion to the concrete surface. Thereafter a self-adherent, cohesive mixture of delignified cellulose pulp fibers and a liquid electrolyte solution is sprayed onto the surface of the concrete, to a level to cover and embed the ribbon-like electrode element, forming an electrolytic medium associated with the electrode element. A DC voltage is impressed between the internal reinforcement and the embedded electrode element to effect electro-chemical chloride removal and/or realkalization of the concrete in a procedure of finite time duration. Preferably, the electrode strip is passed about conductive supports at one side of the treating area, so that the voltage is connected to the electrode strip at a plurality of locations. Flame and smoulder retardants are mixed with the dry cellulose fibers in advance of being applied to the concrete, by spraying through the previously mounted electrode structure.

6 Claims, 5 Drawing Sheets

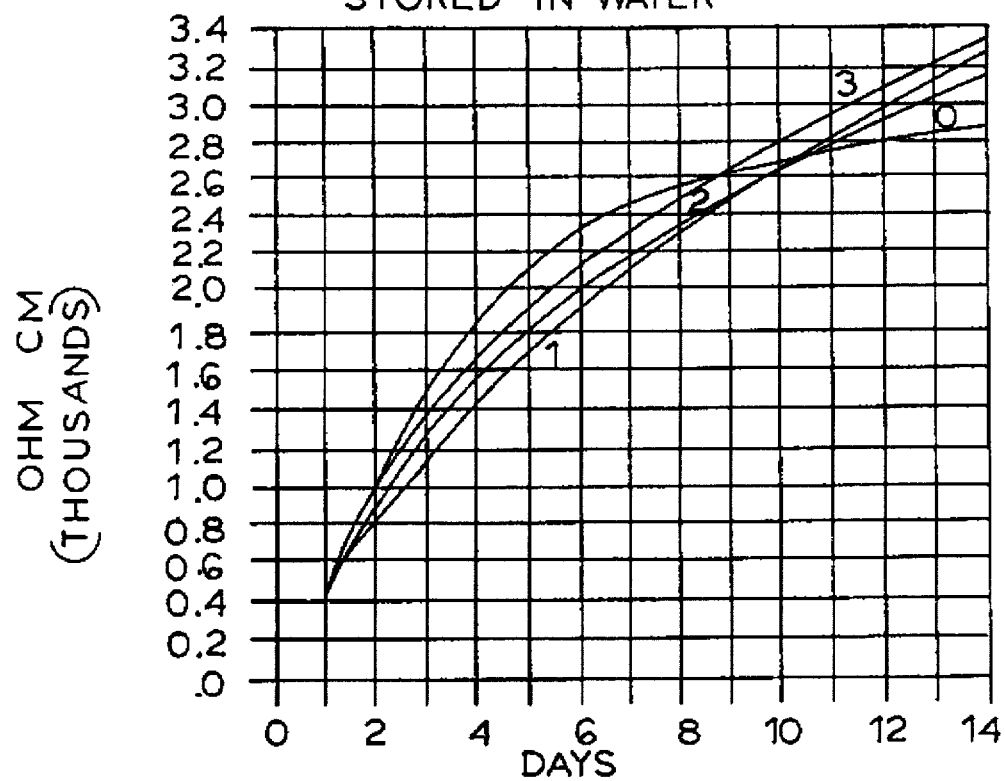
FIG. 7 — 10% MICROSILICA, STORED IN WATER
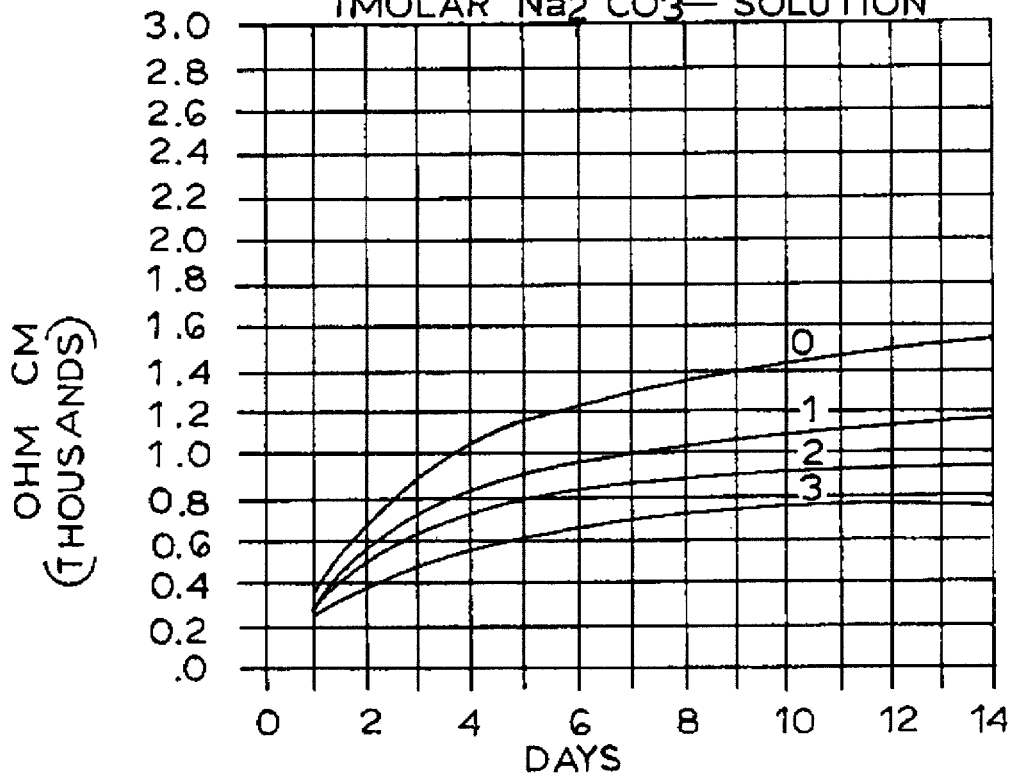
FIG. 8 — 0% MICROSILICA, STORED IN 1 MOLAR $Na_2CO_3$ — SOLUTION

ELECTRO-CHEMICAL METHOD FOR MINIMIZING OR PREVENTING CORROSION OF REINFORCEMENT IN CONCRETE

RELATED APPLICATIONS

The present application a division of my parent application Ser. No. 781,989, filed Oct. 24, 1991, now U.S. Pat. No. 5,320,722. The parent application, in turn is a continuation in part of my U.S. application Ser. No. 539,069, filed Jun. 15, 1990, (now U.S. Pat. No. 5,228,959, granted Jul. 20, 1993) which in turn is a division of application Ser. No. 366,204, filed Jun. 9, 1989(now U.S. Pat. No. 5,198,082, granted Mar. 30, 1993. The last-mentioned application is a continuation in part of application Ser. No. 352,266, filed May 16, 1989, now abandoned. Application Ser. No. 352, 266 is a continuation in part of application Ser. No. 100,834, filed Sep. 25, 1987, now U.S. Pat. No. 4,832,803. This application derives elements of priority from all of the foregoing applications except Ser. No. 100,834. This application is also related to my U.S. Pat. No. 5,015,351, granted May 14, 1991, and my U.S. Pat. No. 4,865,702, granted Sep. 12, 1989.

BACKGROUND AND SUMMARY OF THE INVENTION

Many reinforced concrete structures, which are exposed to the elements, will undergo a gradual change in internal chemistry in such a manner as to subject the internal steel reinforcing elements to corrosion. Under some circumstances, the concrete undergoes a slow carbonation process. As a result, the normally relatively high alkaline level of the concrete is progressively reduced. Eventually, the pH of the concrete reaches a level (around 9.5) at which it is no longer capable of preventing corrosion of the internal reinforcement.

Concrete can also become corrosive to its internal reinforcement where it is exposed to chloride infusion. This is common for roadways, bridge decks, parking garages, and the like, where chloride salts may be employed for controlling ice formation in the winter time. Over time, concrete exposed to chloride salts can become sufficiently infused therewith, that the internal steel reinforcement of the structure is subject to corrosion by reaction with the chlorides. In some cases, chlorides may be present in the concrete from the beginning, being used in some instances to hasten the process of the setting of freshly poured concrete.

In the above situations, if the condition is allowed to continue, serious damage to the concrete structure can be expected. When the internal reinforcement begins to corrode, it tends to expand, and the neighboring concrete is caused to crack and spall.

Procedures have been developed for rehabilitating concrete structures, to effect realkalization thereof or to reduce the chloride content, or both, depending upon the particular circumstances. The Vennesland et al. U.S. Pat. No. 4,832, 803, for example, discloses an advantageous electro-chemical procedure for removing chlorides from mature concrete structures to significantly reduce corrosive conditions in and around the internal reinforcement. The Miller U.S. Pat. No. 4,865,702 discloses an electro-chemical process for realkalizing a mature concrete structure, also for the purpose of minimizing the corrosive activity of the concrete in the region of the internal reinforcement. The Miller U.S. Pat. No. 5,015,351 discloses certain electro-osmotic techniques which can be employed to the same end. Certain of the above-mentioned related pending applications are also directed to new and useful techniques for the rehabilitation of mature concrete structures by chloride removal and/or realkalization procedures.

In my prior copending U.S. application Ser. No. 539,069, filed Jun. 15, 1990, I disclose a rehabilitation procedure which involves application to an exposed surface of a concrete structure of a sprayed-on layer of self-adherent fibrous cellulosic pulp mixed with a liquid electrolyte. After applying a layer of desired thickness, a mesh-like electrode is placed over the matte of self-adherent pulp, after which a further covering layer of the self-adherent pulp is sprayed over the top of the electrode structure so that the electrode mesh is embedded in the fibrous matte. By maintaining an appropriate D.C. electrical potential between the embedded electrode structure and the internal reinforcement of the concrete, while maintaining the fibrous self-adherent pulp mass in a moist, electrolytically effective condition, it is possible to cause a migration of chloride out of the concrete, or to effect an infusion of hydroxyl molecules into the concrete, depending on whether the process being carried out is one of chloride removal or one of realkalization. The process according to my copending application is particularly advantageous in that the self-adherent fibrous pulp is easily applied to the structure, can be frequently remoistened as necessary, and is easily removed when process has been completed.

In accordance with the present invention, further significant improvements are made in the process and equipment disclosed in my copending application Ser. No. 539,069, enabling the procedures disclosed therein to be carried out even more expeditiously and economically.

Initially, the surface of the concrete to be treated must be prepared to receive the treatment. Typically, concrete that has reached the stage of requiring rehabilitation is already suffering from cracking, spalling and delamination. These defects are cleared and opened up to sound concrete by conventional methods. Pursuant to one aspect of the invention, cracks and voids are filled with a specially prepared mortar mixture having resistivity and capillarity compatible with the parent concrete. In addition, the mortar mixture is suitable for extended exposure to the electro-chemical environment while also accommodating the electrolytic action or electro-osmotic action which drives the rehabilitation process.

In accordance with known techniques, a distributed electrode structure is established over the face of the concrete to be treated. This electrode structure is embedded in an adherent electrolytic medium, advantageously a matte of cellulosic fibrous pulp, which is sprayed onto the surface to be treated as a mixture of the fibrous pulp material and a liquid electrolyte. A source of D.C. voltage is connected, one side to the distributed electrode structure embedded in the adherent coating, and the other terminal connected to the internal reinforcement of the concrete.

In accordance with one of the advantageous features of the present invention, a novel and improved form of distributed electrode structure is provided for placement on the external surface of the concrete to be treated. The new structure includes a pair of spaced-apart electrode supports, which may advantageously be in the form of elongated strips of wood, for example, of a thickness to support electrode elements at a suitable distance from the surface of the concrete. The electrode supports in turn mount a plurality of electrode support studs, which project outwardly from the supports at closely-spaced intervals. The studs are mounted on flexible mounting strips, which can easily be conformed to contoured surfaces. The mounting strip for at least one of the electrode supports, and usually only one, constitutes a conductive bus, by which each of the electrically conductive support studs can be connected to a voltage source. The distributed electrode is formed by a continuous electroconductive element, which is threaded back and forth continuously from one electrode support to the other, being engaged at each end by one of the support lugs, so that the electrode element extends sinuously back and forth between opposed electrode supports, along the length of each of them, forming the desired distributed electrode structure.

After placing the electrode supports and installing the sinuous electrode element, the self-adherent electrolytic medium is sprayed onto the surface of the concrete, being sprayed through the installed distributed electrode. The sprayed medium is applied to a depth sufficient to fully cover and embed the distributed electrode.

To particular advantage, the sinuously installed continuous electrode element is in the form of a thin, flat, ribbon-like metallic strip, oriented on edge relative to the surface of the concrete being treated. The ribbon-like electrode strip thus presents a large conductive area to the electrolytic fiber mass in which it is embedded, while presenting minimum resistance to and interference with the sprayed-on application of the electrolytic mass following installation of the electrode.

The cellulosic pulp material employed in forming the self-adherent electrolytic mass is specially processed to facilitate its handling and application, and also to optimize the cosmetic aspects of the procedure, by minimizing staining and discoloration of the concrete.

For a more complete understanding of the above and other features and advantages of the invention, reference should be made to the following detailed description of a preferred embodiment and practice of the invention, and to the accompanying drawings.

DESCRIPTION OF THE DRAWINGS

FIGS. 5–7 are graphic diagrams illustrating the variation of mortar resistivity with time, as a function of mixtures of sand and microsilica, in a water environment.

FIGS. 8–10 are graphic diagrams similar to FIGS. 5–7 illustrating variation of mortar resistivity in a sodium carbonate environment.

DESCRIPTION OF PREFERRED EMBODIMENTS

Figure 1:
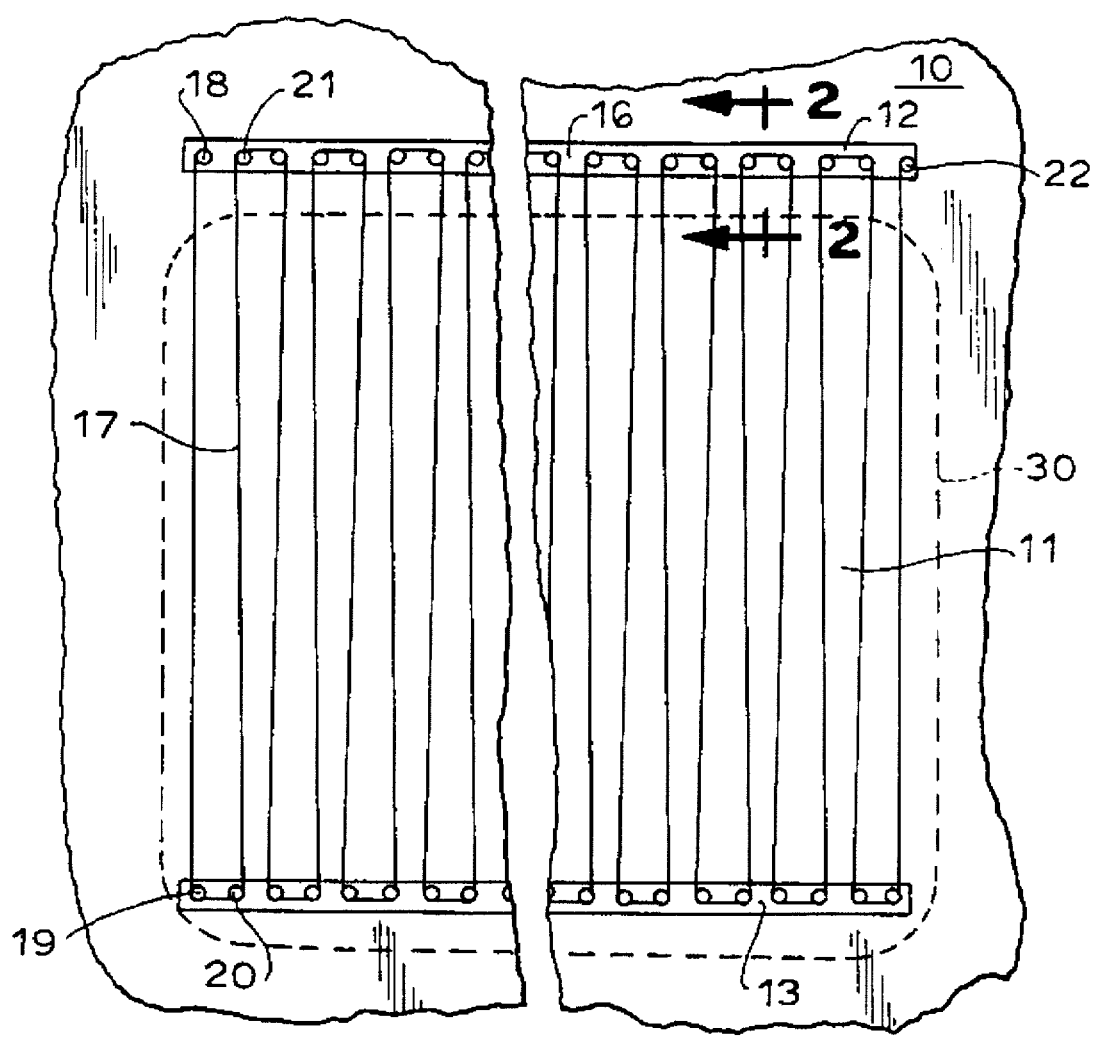
FIG. 1 is a front elevational view of a section of concrete structure mounting a distributed electrode structure according to the invention.

Referring now to the drawing, the reference 10 (FIG. 1) illustrates generally a section of concrete structure to be treated according to the invention. The illustrated structure is a vertical wall or column. However, it is to be understood that the procedures of an apparatus of the invention are applicable to surfaces of concrete structures which are horizontal, vertical, upwardly facing, downwardly facing, etc. For convenience, a structure of large area typically is processed in individual segments of predetermined area, which may be less than the entire structure.

As a preliminary step in the rehabilitation process, the surface area of the concrete to be processed is examined for faults, such as cracks, spalls and delaminations. Any such faults are opened up by power chisels or other means to expose sound concrete. The surfaces of the "wounds" are then cleaned of dust, rust and loose particles, as by brushing, vacuuming, water jets, sandblasting or other suitable procedures, depending on the circumstances, so that a solid, sound surface is exposed for treatment.

After cleaning, as above described, any cracks or other deep wounds in the concrete are filled with a suitable mortar having characteristics compatible with the subsequent procedures to be carried out. Among other things, the mortar should have an electrical resistivity compatible with that of the parent concrete and the requirements of the electro chemical process, typically between about 200 ohm-cm and about 3,000 ohm-cm. It must also have a high permeability to chloride and hydroxyl ions. The mortar must be sufficiently self-adherent to the basic concrete substrate to bond adequately without the use of so-called bonding bridges, since the materials used for such bonding bridges often are relatively impervious to the dissolved ions and may be relatively poor conductors as well. The mortar material also should be capable of setting in a relatively short time, for example, 30 minutes, under relatively alkaline conditions, and must have a long term resistance to highly alkaline (e.g., pH 13) conditions. The mortar also must be highly resistant to shrinkage and cracking, even if applied in relatively thick layers, for example, several centimeters.

Pursuant to one aspect of the invention, a suitable mortar, meeting the requirements indicated above, is formulated using a special mortar base which is made available, as of the filing date of this application, by Liquid Plastics, of Preston, England, under the trade designation NCT 2000 MB. The indicated mortar base incorporates, in addition to the usual cementitious materials, polymeric fibers, usually polypropylene, polyamide, and/or polyester to control shrinkage. The mixture may contain other polymers to make the mortar resistant to a sodium carbonate environment, as may be required particularly during realkalization procedures.

In order to achieve an acceptable degree of uniformity in the rehabilitation process, particularly if the initial repair with mortar is rather extensive, the resistivity and capillarity of the cured mortar must be compatible both with the concrete and with the process itself. Otherwise, there may be a preferential migration of ions or molecules in certain portions of the overall area under treatment. I have found that, by controllably mixing microsilica into the mortar mix, otherwise comprised of the mortar base and a desired amount of sand or fine aggregate, the resistivity of the cured mortar may be quite accurately controlled to give the best compromise between the characteristics of the parent concrete and the requirements of the process.

Figure 5:
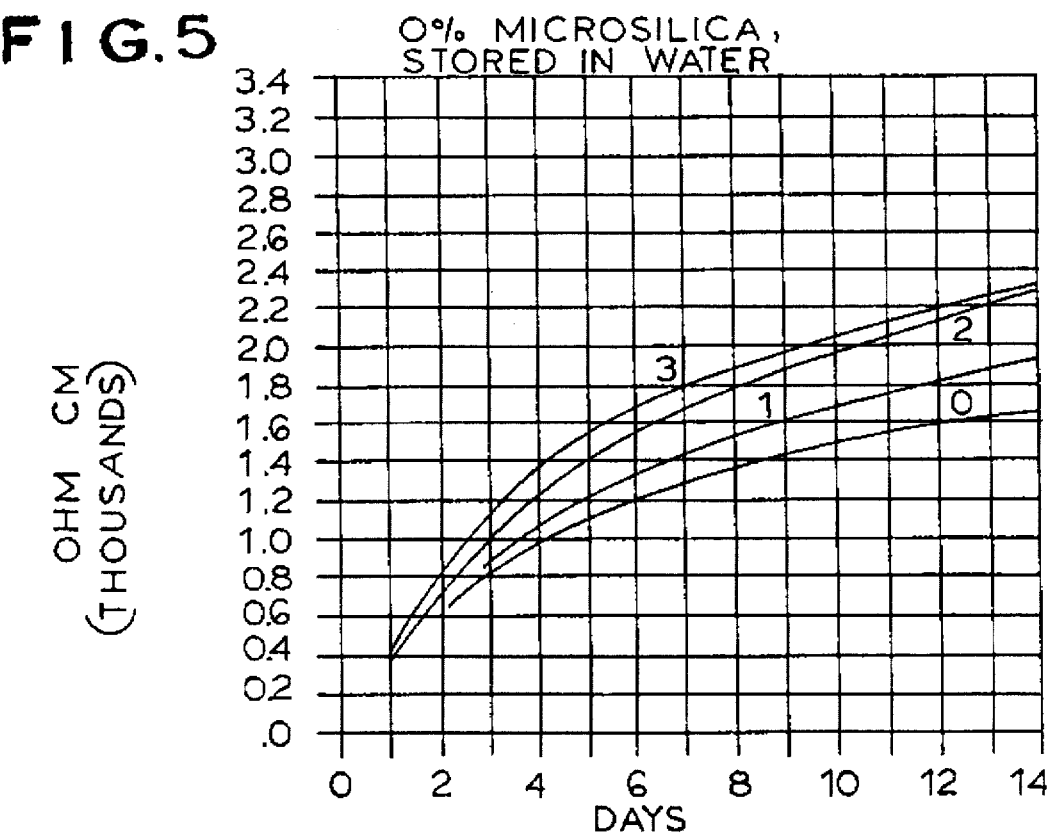
Figure 6:
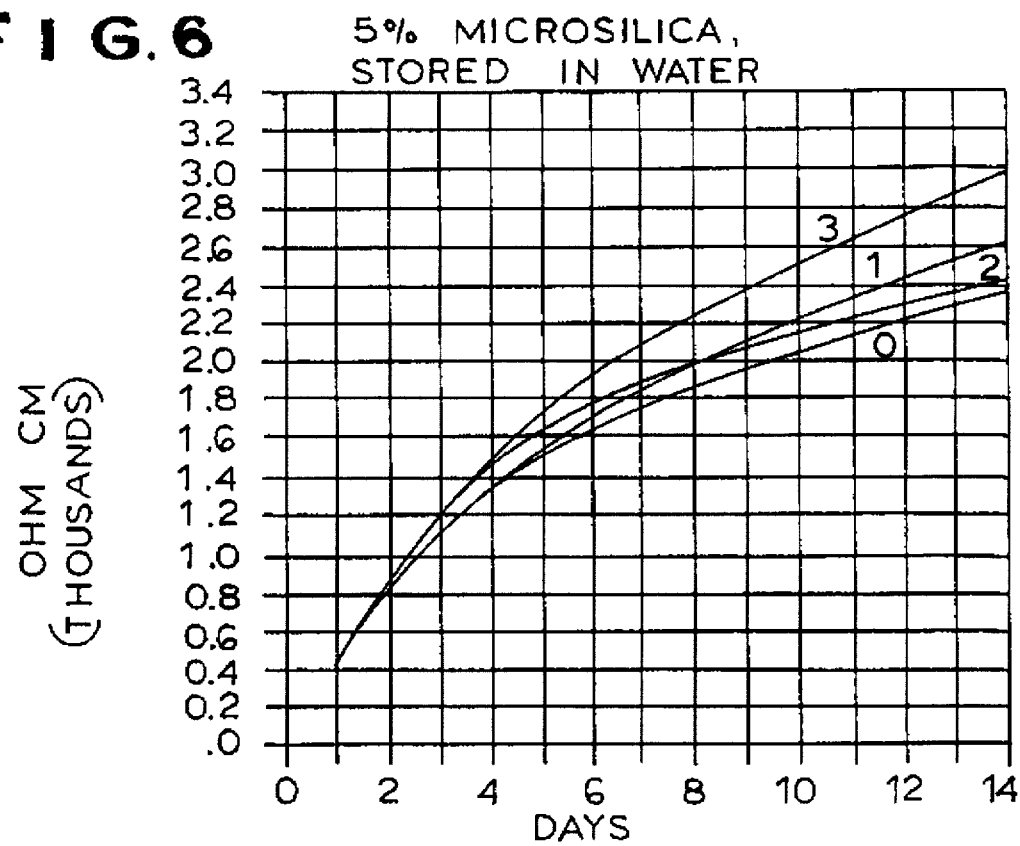

Before preparing the mortar mix, measurements are made on the existing parent concrete to establish its approximate resistivity. Reference can then be made to the graphs shown in FIGS. 5–10 to select a suitable mixture. For example, if the process to be performed is chloride removal, the process environment calls for the electrolytic medium to be principally a water-pulp mixture, with minor additions of sodium carbonate to provide adequate conductivity. Reference would then be made to FIGS. 5–7, which indicate resistivity of various mixtures of mortar base and sand, with various amounts of added microsilica, over a period of time. In each Figure, the curves labeled "0", "1", "2" and "3" refer to the weight of sand per unit weight of the mortar base. FIG. 5 shows resistivity with no microsilica additions, FIG. 6 with 5% microsilica by weight of the mortar base, and FIG. 7 with 10% microsilica addition. The proper amount of sand to be used typically is selected in accordance with the strength and other physical characteristics desired in the mortar.

As will be observed in FIGS. 5–7, the levels of resistivity of the solidified and curing mortar generally increase with increasing additions of microsilica. Accordingly, after determining the resistivity of the concrete, in the area under treatment, a mortar mixture is formulated by resort to a series of curves, of which those of FIGS. 5–7 are representative, to achieve the necessary resistivity, usually in the range of from about 200 ohm-cm to about 10,000 ohm-cm.

Inasmuch as mortar resistivity increases with time, it is generally preferred to select a resistivity value which is slightly lower than that of the concrete, at a time appropriate to the process being carried out. For a chloride removal procedure, the relevant time period for resistivity determination may be about 14 days, i.e., after the mortar mix has cured for about 14 days in the process environment (principally a water electrolyte).

Figure 9:
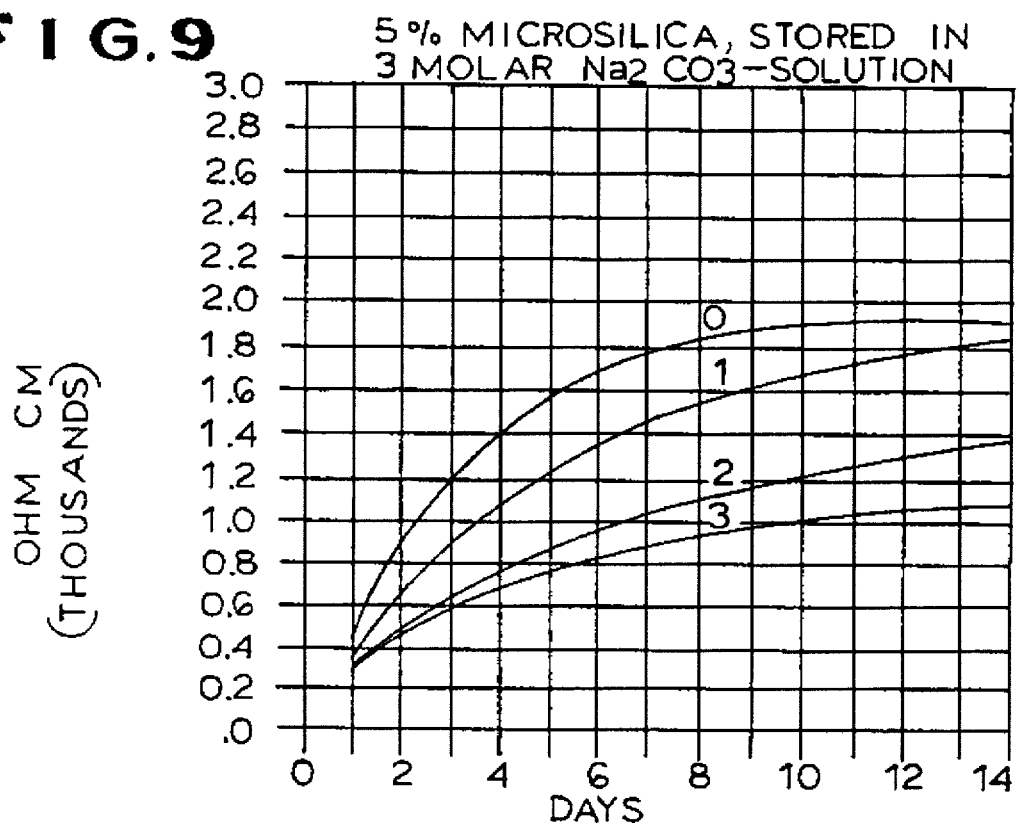
Figure 10:
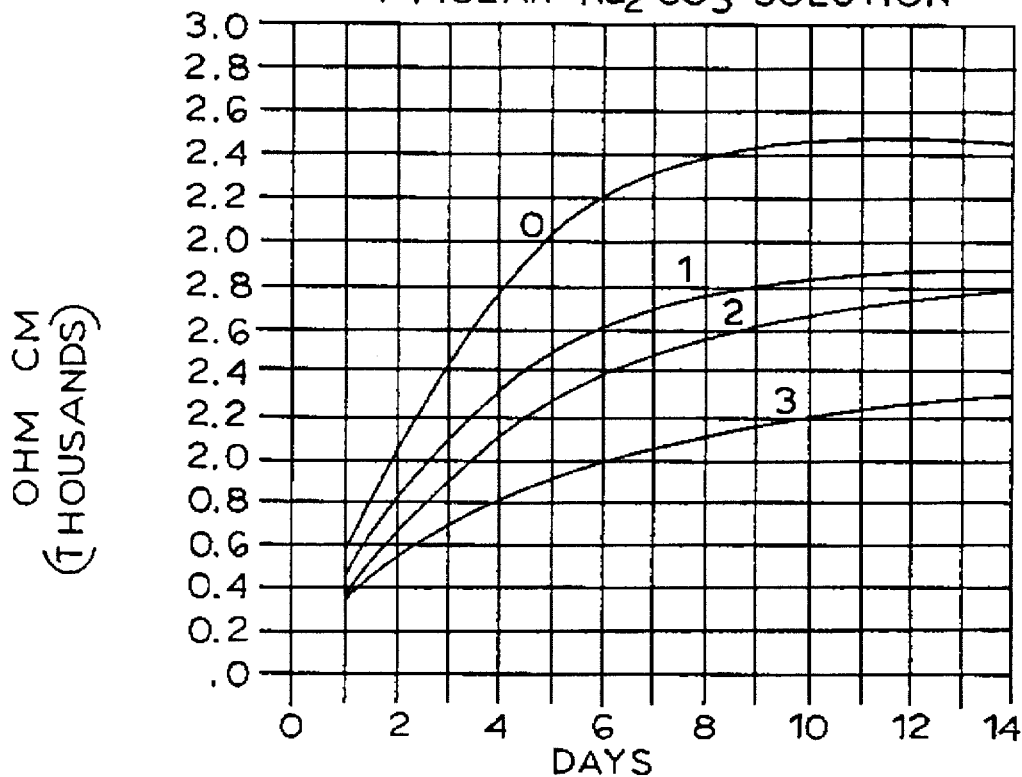

For realkalization procedures, the process environment preferably involves a sodium carbonate electrolyte, for which FIGS. 8–10 are illustrative of resistivity values over a limited range. Realkalization procedures typically are of shorter duration than chloride removal, and it may be appropriate to select resistivity values at about 4 days, i.e., after the mortar mix has cured for about 4 days in an environment of an approximately 1 molar solution of $Na_2CO_3$. As with the prior example, mortar resistivity preferably is selected to have a 4 day value slightly below that of the concrete to which it is applied.

A second factor in the preparation of the mortar mix is its capillarity in a cured or partially cured state, which desirably should be at least as great as that of the parent concrete so as not to act as a barrier or partial barrier to the passage of ions or molecules as required by the electrolytic or electro-osmotic procedures. This is accomplished by varying the amount and type of sand which is added to the cementitious mortar base. Desirably the sand (or fine aggregate) is screened to have a relatively consistent particle size, rather than a full spectrum of particle sizes, which tends to result in a mixture which is too dense for the purposes of the procedures to be carried out. The proper amount and type of sand can be empirically determined.

As illustrated in FIG. 1, an area 11 to be rehabilitated is bounded at the top and at the bottom by upper and lower strip-like electrode supports 12, 13. The electrode supports 12, 13 are comprised of elongated strips 14, of wood or other suitable insulating material. Each strip mounts on its outer surface a plurality of spaced-apart electrode support studs 15, spaced a short distance apart over the length of the electrode supports. Typically, the studs 15 may be spaced apart a distance of approximately 50 mm. The studs desirably are secured to flexible strips, which are in turn mounted on insulating elements, such as the wood strips 14. This allows the electrode support structure to be conformed to non-flat contours where necessary. At least one of the electrode supports, and this would be the upper support 12 in the arrangement illustrated in FIG. 1, incorporates a flexible conductive metal bus strip 16, preferably copper, brass or stainless steel, which extends along the working length of the electrode support and is electrically connected to each of the electrode support studs 15, substantially in the manner indicated in FIG. 2. The studs 15 and conductive strip 16 are secured to the insulating strip 14 by any suitable means, not specifically shown. The upper and lower electrode supports 12, 13 are secured to the surface of the concrete area 11, by any suitable means, such as bolts anchored in the concrete structure.

A continuous electrode element 17 is installed on the electrode support studs 15 in a vertical zig-zag pattern, as particularly shown in FIG. 1. The electrode element is anchored at one end, as for example, at the stud 18, shown in FIG. 1. It is then passed vertically downward to a corresponding stud 19 mounted on the lower electrode support 13. Advantageously, the electrode element is then extended horizontally about the adjacent lower stud 20 and then vertically upward to an opposed stud 21 carried by the upper electrode 12. The electrode element 17 is thus threaded back and forth between the respective upper and lower electrode supports 12, 13 to form an electrode structure consisting of a large number of parallel strands of the electrode element, spaced apart a suitable distance, typically about 50 millimeters. At the opposite end of the structure, the electrode element 17 is suitably anchored to the final electrode support stud 22.

Figure 2:
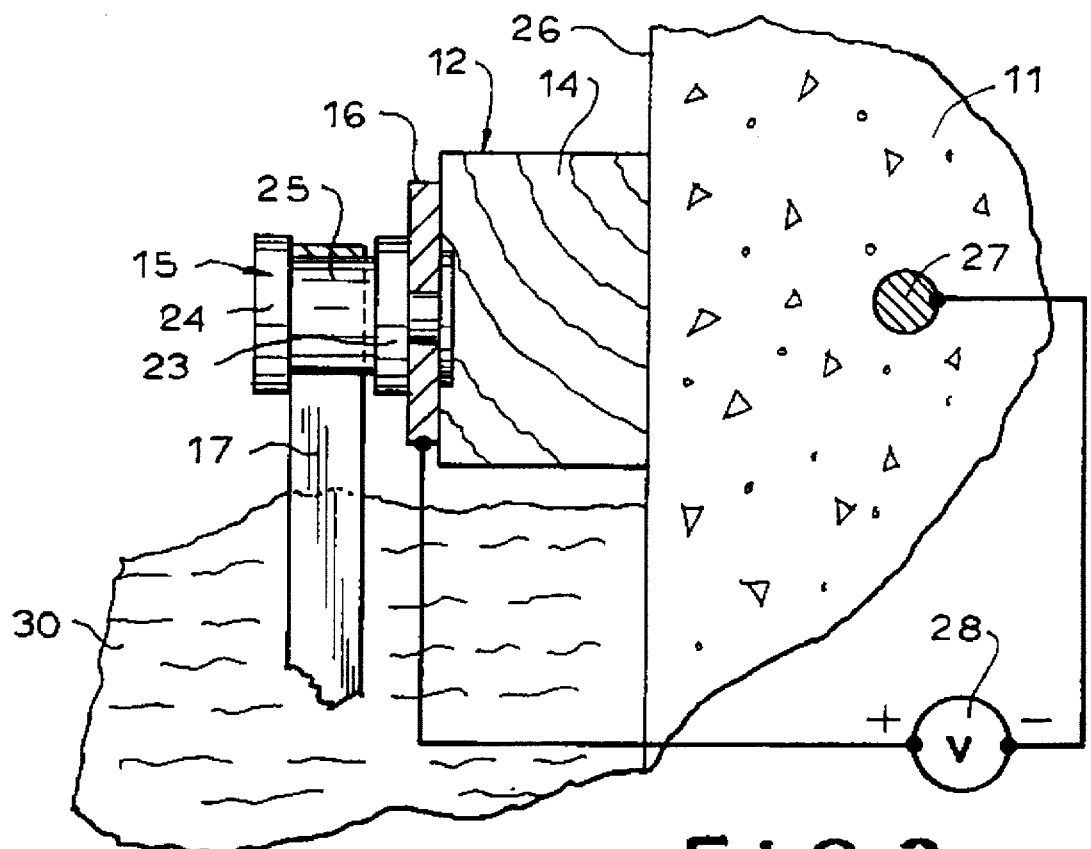
FIG. 2 is an enlarged, fragmentary cross-sectional view as taken generally on line 2—2 of FIG. 1, illustrating details of construction of an electrode mounting strip according to the invention.

To particular advantage, the electrode element 17 is a flat conductive metal strip, which is suitably flexible to be guided back and forth between the opposed sets of electrode support studs. A particularly preferred form of such metallic strip is made available by Eltech Systems Corporation, under the trade designation Elgard Anode Ribbon. This is a titanium strip, available in widths of approximately 6.3 or 12.7 mm and having a thickness of approximately 0.63 mm. Usually, the wider (12.7 mm) strip is preferred for the purposes of this invention. The titanium ribbon material is preferably coated with an electro-catalytic deposit of platinum metal oxides. As shown in FIG. 2, the conductive electrode support studs 15 preferably are of a bobbin-like configuration, with inner and outer flanges 23, 24 defining a central flat-bottom recess 25 of a width suitable to receive the flat strip-like electrode element 17, substantially as shown in FIG. 2. This arrangement allows the electrode strip to be oriented on edge, relative to the flat surface of the concrete area 11 to be treated, which is a particularly advantageous orientation as will subsequently appear.

Desirably, the configuration of the insulating strip 14, the conductive bus strip 16 and the bobbin-like studs 15 is such that the center line of the electrode strip 17 is spaced from the surface 26 of the concrete by a distance of at least about 10 mm.

As shown in FIG. 2, the internal reinforcement 27 of the concrete is connected as a cathode to a source of DC voltage 28, and the bus stud 16 is connected as an anode to the same voltage source. Electrical contact with the internal reinforcement is made in any convenient manner, sometimes to a section exposed in an existing crack in the structure, and otherwise accessed by drilling or chiselling into the structure to expose a section of the reinforcement. The number and location of the connections to the internal reinforcement may vary widely. Desirably, however, there should not be less than two such connections, and if the area to be treated is greater than 50 square meters, there should be at least one connection per every 50 $m^2$ of the area under treatment.

As is evident in FIG. 1, the conductive bus 16, extending along the full length of the upper electrode support 12 serves to make an electrical connection with the electrode strip 17 at each point where the electrode passes over a support stud 15. Accordingly, theoretically, at least, it is not necessary for the strip to be of great length. It is convenient, however, to utilize a single strip to form the electrode structure for a given area under treatment. If necessary, strips may be spliced together by spot welding or otherwise. Likewise, the strips may be anchored to the bobbin-like electrode supports 15 by forming end loops in the strip, by spot welding, clamping or the like.

Following the mounting of the anode structure, comprised of the spaced-apart electrode supports 12, 13 and the sinuously arranged electrode strip 17, the surface of the concrete, in the area to be treated, is sprayed with an electrolytic composition, comprised of a fibrous cellulosic pulp mixed with a liquid electrolyte, to form a self-adherent, cohesive electrolytic medium. The pulp material advantageously is formed of 100 percent natural cellulose fibers, with additions of mineral fire and smoulder retardants, such as borax, magnesium and/or aluminum oxides, and certain silicates, for example. Desirably, the dry fiber is premixed with the fire retardants. At the job site, the fibrous electrolyte is applied to the surface to be treated by way of a suitable mixing spray nozzle, which simultaneously mixes and discharges a spray comprised of the fibrous material together with a desired liquid electrolyte.

Preferably, the cellulose fiber has been processed to remove as much as practical of its lignin content, which is subject to being leached into the concrete in the alkaline environment to which it is exposed. Ideal cellulosic pulp materials for the purposes of the invention are made available commercially as of the filing date hereof by Excel Industries, Ltd. Ebbw Vale, Gwent, England, under the trade designations NCT 2000 FG and NCT 2000 FW. The material typically has a pH of about 6.5–7.5, a loose bulk density of approximately 25 kg/m$^3$. The material is formulated to provide for water absorption of approximately 1500 per cent of the weight of the dry fiber, to wet out rapidly and have slow drainage characteristics.

To provide adequate conductivity, the liquid electrolyte solution must contain sufficient ions. These must be associated with hydroxyl ions in order to insure that the treated concrete retains sufficiently high alkalinity to passivate the internal reinforcement, and to maintain the steel reinforcement in a passivated state. This is achieved by insuring that alkali metal ions are present in the electrolyte. To particular advantage and in accordance with the invention, the liquid electrolyte contains sodium carbonate in concentrations varying from 1/100 molar for procedures designed strictly for chloride extraction, to one molar, for procedures designed purely for electro-osmotic realkalization of the concrete. Sodium carbonate is the material of choice, as it absorbs carbon dioxide from the air only to a limited extent before an equilibrium is attained. This assures that the pH of the resulting solution does not get significantly below about 10.6, which is adequately high to cause and maintain passivity of the reinforcing steel. Moreover, cathodic reactions with the steel reinforcement tend to cause production of hydroxyl ions, resulting in the formation of sodium hydroxide, eventually changing to sodium carbonate. Sodium carbonate is also desireable because of its relative cheapness, ready availability, non-toxic nature, and its low ionic dissociation. Sodium carbonate is thus a preferred electrolyte material from a number of viewpoints.

Sodium carbonate, in the form of light soda ash, available from Solvay Chemical and others, is preferably utilized in the preparation of the sodium carbonate electrolyte. The preference for light soda ash is due to its ease of solution as compared to dense soda ash, which is granulated, and to crystalline soda, which both can be considerably more difficult to dissolve on site. Light soda ash is easily soluble in water at ordinary tap temperatures by simple stirring, as opposed to the other grades which often require preheating of the water of solution, and/or vigorous agitation.

In the process of the invention, the mixture of pulp fiber and liquid electrolyte is sprayed over the area to be treated, to a depth of at least about 30 mm, measured from the surface of the concrete, forming a layer 30, as shown in FIG. 2, which completely embeds the electrode strip 17. In this respect, by utilizing a ribbon-like strip material for the electrode 17, and orienting the material on edge, adequate conductive electrode surface area is presented to the electrolytic mass 30, while at the same time the adjacent sections of the electrode strip can be spaced far enough apart that the surface of the concrete is fully exposed and accessible to the spray equipment. This arrangement enables the electrode structure to be installed over the bare concrete, and the electrolytic fiber mass to be applied in a single spray operation. This has proven to be more expeditious and economical than utilizing a mesh form of electrode, for example, which generally requires that the electrode structure and fiber mass be installed as a three-part operation, with a first layer of fiber being sprayed on the open face of the concrete, after which the electrode mesh is installed over that layer, following which a second layer of fibrous electrolyte is sprayed over the top of the electrode mesh.

Additionally, although a titanium based mesh electrode may be theoretically reused a large number of times, the practical aspects of installing and reinstalling mesh electrode are such that it may no longer be a useful material after two or three installations, because of mechanical deformations through handling, shaping, etc. By comparison, the strip electrode, used in the manner disclosed herein, can be rereeled and used over and over again. If it is cut or broken, it can be readily spliced by spot welding or otherwise joining overlapping ends of the material.

As reflected in FIG. 2 of the drawing, the sprayed-on fibrous electrolytic mass 30 is supplied in such a way as to be kept effectively spaced from the conductive bus strip 16, as otherwise the bus could corrode heavily during the process. Thus, in an installation as shown in FIG. 1, where upper and lower spaced-apart electrode supports 12,13 are employed, it is advantageous that only the upper electrode support be provided with a conductive bus 16. The lower electrode support 13 usually is subjected to gravity flow and dripping during the spraying-on procedures, and also during subsequent re-wetting of the adherent mass, which typically is required on a regular basis. If desired, the two spaced-apart electrode supports 12 and 13 could be oriented vertically, in which case it might be practical to employ bus strips 16 along both electrode supports, as long as the spray application of the adherent fiber mass is conducted in such manner as to keep the strips on both sides free of the electrolyte.

After application of the adherent electrolytic mass, a DC voltage is applied by the voltage source 28 at a level to provide for a current flow through the area of treatment at a rate of not more than about five amps/m$^2$, with approximately one amp/m$^2$ as a preferred value. Generally, the voltage source 28 does not exceed 40 volts DC, for safety purposes.

The application of electrical current to the external electrode structure and internal rebar structure is continued as long as necessary (usually a period of several days or a few weeks) until the desired level of realkalization and/or chloride extraction has been achieved. This is determined by analysis of concrete samples extracted at various time intervals.

Depending on conditions, it may be advantageous to interrupt and/or temporarily reverse current flow to prevent polarization of the internal reinforcement.

Once the desired level of treatment has been achieved, the adherent electrolytic pulp mass is removed by scraping and/or washing. The ribbon-like electrode strip 17 is removed and rewound onto a suitable reel for reuse, and the studded electrode supports 12, 13 are removed from the surface of the concrete, washed, and readied for reuse. Holes formed for mounting of the electrode supports and/or testing of the concrete are filled with mortar. In this respect, the procedure of the invention usually enables the rehabilitation to be carried out using fewer electrode supports than are required when using a mesh type of electrode structure. Accordingly, there is less patching to be performed upon completion. The electrode strip is sufficiently stiff edgewise to enable an opposed pair of electrode supports 12,13 to be spaced considerably farther apart than, for example, with a mesh electrode, without requiring intermediate supports. The electrode element should not, of course, contact the concrete directly, but only through the electrolyte medium.

Figure 4:
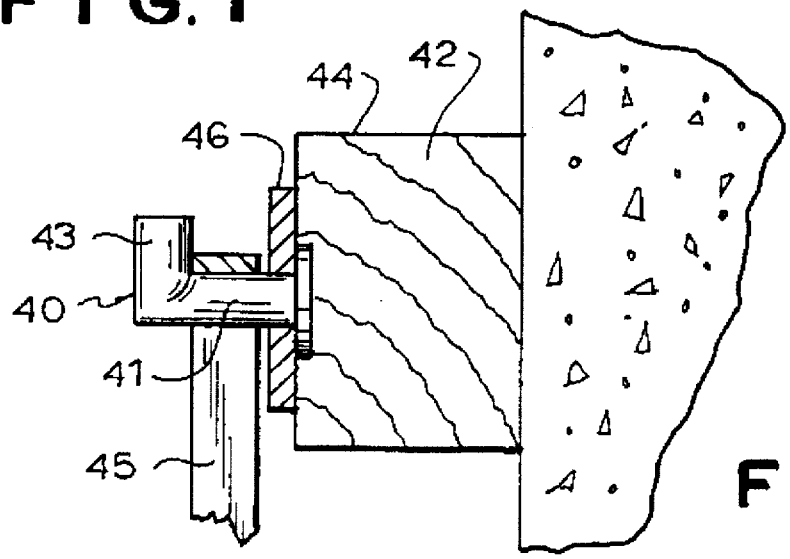
FIG. 4 is a fragmentary cross-sectional view, illustrating a modified form of electrode supporting stud for use in connection with the electrode support structure of FIG. 2.
Figure 3:
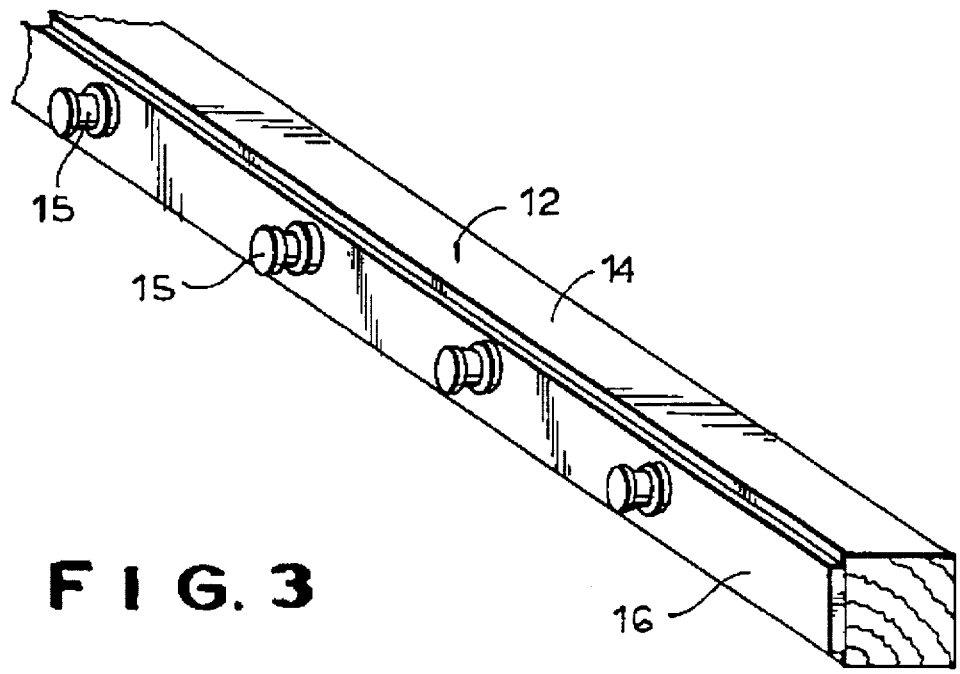
FIG. 3 is a fragmentary perspective view of the electrode strip shown in FIG. 2.

In FIG. 4 of the drawing, there is shown one possible modification of electrode support stud, which may be employed in place of the stud 15 shown in FIG. 2. The stud 40 of FIG. 4 includes a post or stem 41 mounted on a flexible support 46 and projecting outward therefrom. At its outer end, the stem 41 joins with an arm 43 extending at right angles thereto and oriented to point toward one side edge 44 of the mounting strip 42. The modified support studs 40 are spaced apart in the same manner as shown in FIG. 3, for example. All of the arm portions 43 are oriented in the same direction, toward a side of the insulating supports 42. The supports are used in spaced-apart pairs, in the same manner as shown in FIG. 1, with the upper and lower strips being oriented so that the arms 43 are directed away from each other. The continuous electrode element 45 is threaded back and forth between studs at opposite sides, in the same manner as indicated in FIG. 1. As will be understood, a wide variety of support studs and conductive busses may be employed. Desirably, all of the studs carried by at least one of the supports 42 are formed of conductive material and are mounted on a conductive bus strip 46, so that voltage may be applied to the continuous electrode element 45 at various points along its length (i.e., at each of the conductive lugs 40 connected to a bus trip 46).

The procedure and apparatus of the present invention add significant simplification and economy to the practice of the processes, known from our above-mentioned patents, of rehabilitating mature concrete structures by chloride removal and/or realkalization. Moreover, the utilization of mortar mixtures specifically formulated to have compatible resistivity and capillarity, with respect to the parent concrete as well as the process requirements, assures a high level of uniformity in the processing of the concrete, especially where considerable advance mortar repair is required.

It should be understood that the specific forms of the invention herein illustrated and described are intended to be representative only, as certain changes may be made therein without departing from the clear teachings of the disclosure.

Accordingly, reference should be made to the appended claims in determining the full scope of the invention.

I claim:

1. In the method of electro-chemically treating mature, damaged concrete to minimize corrosion of internal reinforcement, wherein a distributed electrode structure is mounted over a surface of the concrete, a self-adherent electrolyte material is applied to said surface, with said electrode structure being embedded therein, and electrical current is caused to flow between said distributed electrode structure and said internal reinforcement for effecting rehabilitation of said concrete and protection of said internal reinforcement, and said self-adherent material and said electrode structure are thereafter removed from said concrete, the improvement which comprises (a) preparing defects in the surface of said concrete for repair with mortar, (b) determining the approximate resistivity of said concrete, (c) preparing a mortar mixture for effecting said repair wherein said mortar mixture has resistivity compatible with that of said concrete and has a high permeability to chloride and hydroxyl ions, (d) applying said mortar mixture to said defects and allowing said mixture to at least partially cure, (e) thereafter installing said distributed electrode structure and said self-adherent electrolyte, and (f) thereafter applying a voltage between said distributed electrode structure and said reinforcement sufficient to effect a current flow therebetween of not more than about 5 amp/m$^2$ of the treated surface area for a time sufficient to effect a desired rehabilitation of said concrete.

2. A method according to claim 1, further characterized by (a) said mortar comprising a mixture of mortar base, sand and microsilica, in ratios of, for one part by weight of mortar base, up to about three parts by weight of sand and sufficient microsilica, to achieve a resistivity of not more than about 10,000 ohm-cm under exposure to the liquid electrolyte employed.

3. A method according to claim 2, wherein (a) the electro-chemical treatment is predominantly chloride removal, and (b) the resistivity of said mortar mixture is selected to achieve a predetermined level of resistivity under exposure to a predominantly water solution.

4. A method according to claim 2, wherein (a) the electro-chemical treatment is predominantly that of realkalization, and (b) the resistivity of said mortar mixture is selected to achieve a predetermined level of resistivity under exposure to a solution of sodium carbonate.

5. A method according to claim 2, further characterized by (a) said mortar base including, in addition to cementitious material, polymer fibers to resist shrinkage of the mortar mixture upon curing.

6. A method according to claim 2, wherein (a) the sand utilized in said mortar mixture is at least partially screened to reduce the particle size distribution and thereby increase the capillarity of cured mortar.

* * * * *